(12) United States Patent
Hwang et al.

(10) Patent No.: US 8,859,125 B2
(45) Date of Patent: Oct. 14, 2014

(54) BATTERY PACK FRAME WITH ELASTIC MEMBERS AND BATTERY FIXING PORTIONS

(75) Inventors: Kum-Yul Hwang, Yongin-si (KR); Andrey Matyushenko, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 521 days.

(21) Appl. No.: 12/929,781

(22) Filed: Feb. 15, 2011

(65) Prior Publication Data

US 2012/0015227 A1 Jan. 19, 2012

(30) Foreign Application Priority Data

Jul. 15, 2010 (KR) .................. 10-2010-0068580

(51) Int. Cl.
*H01M 2/10* (2006.01)
*H01M 2/14* (2006.01)
*H01M 10/6561* (2014.01)

(52) U.S. Cl.
CPC ........ *H01M 2/1022* (2013.01); *H01M 10/5063* (2013.01); *H01M 2/105* (2013.01); *Y02E 60/12* (2013.01); *H01M 2/14* (2013.01)
USPC ................ 429/99; 429/96; 429/98; 429/100

(58) Field of Classification Search
USPC .......................... 221/282; 206/703; 180/68.5
See application file for complete search history.

(56) References Cited

U.S. PATENT DOCUMENTS

| | | | |
|---|---|---|---|
| 6,174,618 B1 | 1/2001 | Nishiyama et al. | |
| 6,399,238 B1 * | 6/2002 | Oweis et al. | ............... 429/99 |
| 6,783,886 B1 * | 8/2004 | Sakakibara et al. | ........... 429/99 |
| 2004/0142233 A1 * | 7/2004 | Park et al. | ................. 429/100 |
| 2010/0015512 A1 | 1/2010 | Inoue et al. | |

FOREIGN PATENT DOCUMENTS

| | | |
|---|---|---|
| JP | 07-122252 A | 5/1995 |
| JP | 11-111248 A | 4/1999 |
| JP | 2000-048867 A | 2/2000 |
| JP | 2000-133225 A | 5/2000 |
| JP | 2008-124033 A | 5/2008 |
| JP | 2008-270461 A | 11/2008 |

* cited by examiner

*Primary Examiner* — Milton I Cano
*Assistant Examiner* — Carmen Lyles-Irving
(74) *Attorney, Agent, or Firm* — Lee & Morse, P.C.

(57) ABSTRACT

A battery pack frame for accommodating a plurality of secondary cells arranged in parallel with each other, each secondary cell extending axially in a first direction, the battery pack frame including an upper frame for coupling with an upper portion of each of the plurality of secondary cells so as to accommodate the plurality of secondary cells; a lower frame facing the upper frame, the lower frame being for coupling with a lower portion of each of the plurality of secondary cells, the upper and lower frames being spaced from each other in the first direction; and a plurality of elastic members disposed in parallel with each other and extending in the first direction.

19 Claims, 9 Drawing Sheets

BATTERY PACK FRAME WITH ELASTIC MEMBERS AND BATTERY FIXING PORTIONS

BACKGROUND

1. Field

Embodiments relate to a battery pack frame.

2. Description of the Related Art

An electric vehicle, e.g., an electric bicycle, automobile, or a motorcycle, may be equipped with a battery pack including a plurality of secondary cells.

A temperature of the secondary cells may rise due to heat generated while the battery pack operates. Thus, the lifetime of the secondary cells may be reduced unless the heat is efficiently dispersed.

SUMMARY

Embodiments are directed to a battery pack frame.

The embodiments may be realized by providing a battery pack frame for accommodating a plurality of secondary cells arranged in parallel with each other, each secondary cell extending axially in a first direction, the battery pack frame including an upper frame for coupling with an upper portion of each of the plurality of secondary cells so as to accommodate the plurality of secondary cells; a lower frame facing the upper frame, the lower frame being for coupling with a lower portion of each of the plurality of secondary cells, the upper and lower frames being spaced from each other in the first direction; and a plurality of elastic members disposed in parallel with each other and extending in the first direction.

The upper frame and the lower frame may include fixing portions in which the plurality of secondary cells are insertable.

The fixing portions of the upper frame may face the fixing portions of the lower frame.

The fixing portions of the upper frame and the fixing portions of the lower frame may respectively include insert holes therein, the insert holes having a groove shape.

The fixing portions of the upper frame and the fixing portions of the lower frame may respectively include insert holes thereon, the insert holes having a projectional shape.

The insert holes having the projectional shape may include a projection wall extending inwardly in the first direction from the upper and lower frames.

The fixing portions may include ventilating holes for establishing a fluidic connection between external air and upper end surfaces of the plurality of secondary cells.

One end of each elastic member may be fixed to the upper frame, and another end of each elastic member may be fixed to the lower frame.

The plurality of elastic members may be alternately arranged with respect to spaces for accommodating the plurality of secondary cells.

The elastic members may include an insulating material.

The battery pack frame may further include a plurality of spacers between the upper frame and the lower frame, the spacers being parallel with the first direction.

One end of each of the plurality of spacers may be fixed to the upper frame or the lower frame, and another end of each of the plurality of spacers may not be fixed to the battery pack frame.

The plurality of elastic members and the plurality of spacers may be alternately disposed to provide spaces therebetween for accommodating the plurality of secondary cells.

Each spacer may be surrounded by one of the elastic members.

Each of the spacers may include one or more air ventilation holes.

The air ventilation holes may have a rounded shape.

The air ventilation holes may have a slit shape.

Ends of some of the spacers may be fixed to the upper frame, ends of other spacers may be fixed to the lower frame, and the spacers having ends fixed to the upper frame may be alternately disposed relative to the other spacers having ends fixed to the lower frame.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
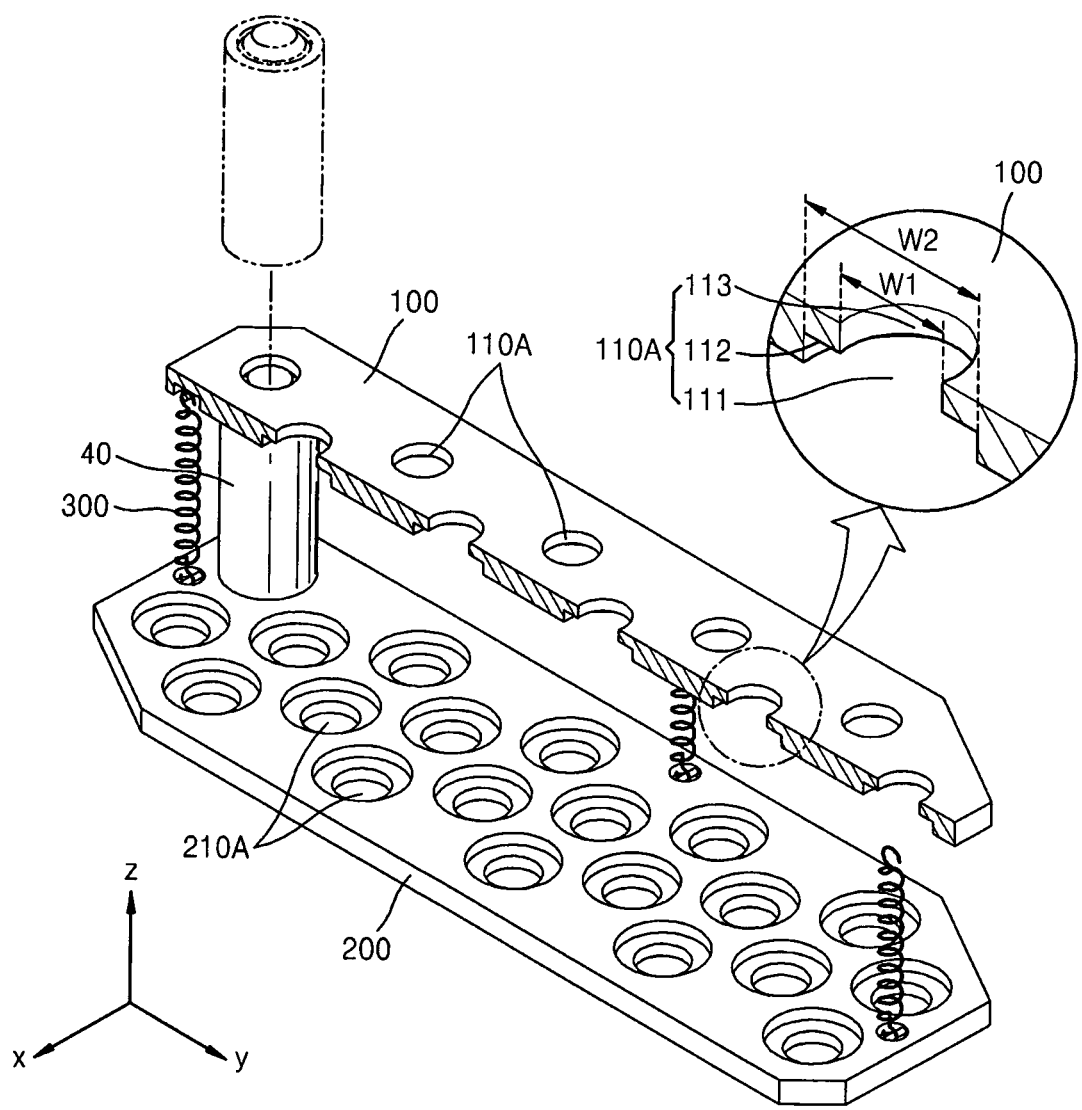
FIG. 1 illustrates a perspective view of a battery pack including a battery pack frame according to an embodiment.

Korean Patent Application No. 10-2010-0068580, filed on Jul. 15, 2010, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout. While terms "first" and "second" are used to describe various components, the components are not limited to the terms "first" and "second".

Figure 2:
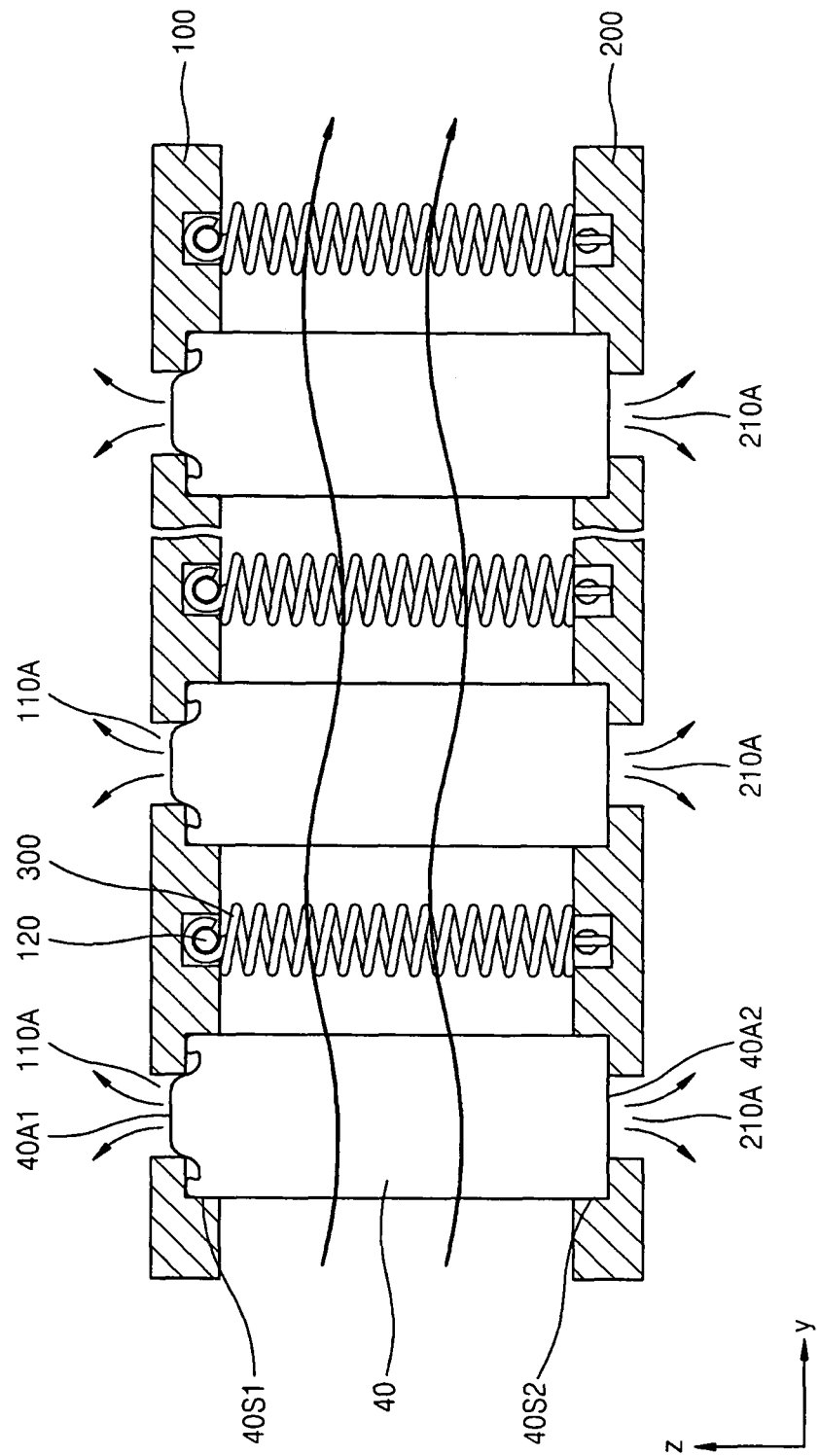
FIG. 2 illustrates a cross-sectional view of the battery pack of FIG. 1.

FIG. 1 illustrates a perspective view of a battery pack including a battery pack frame according to an embodiment. FIG. 2 illustrates a cross-sectional view of the battery pack of FIG. 1. As illustrated in FIGS. 1 and 2, the battery pack may include a plurality of secondary cells 40 and a battery pack frame including an upper frame 100, a lower frame 200, and an elastic member 300.

The secondary cells 40 may be cell assemblies capable of being charged and discharged. The secondary cells 40 may be separated at regular intervals and may be arranged in parallel with each other in a first direction (a Z-axis direction of FIG. 1). The secondary cell 40 may include, e.g., a nickel-cadmium (Ni—Cd) cell, a nickel-hydrogen (Ni—H) cell, a lithium (Li) ion secondary cell, or the like. The Li ion secondary cell may have an operation voltage three times higher than an operation voltage of the Ni—Cd cell or an operation voltage of the Ni—H cell, which may be used as a power source for a portable device. In addition, the Li ion secondary cell may have a high energy density per unit weight, so that the Li ion secondary cell may be used in various ways.

An upper end surface 40A1 and a lower end surface 40A2 of the secondary cell 40 may function as terminals for establishing an electrical connection with an external source or load. The upper end surface 40A1 and the lower end surface 40A2 of the secondary cell 40 may be externally exposed via fixing portions 110A and 210A of the upper frame 100 and the lower frame 200, respectively. As illustrated in FIGS. 1 and 2, the secondary cell 40 may have a cylindrical shape, but a shape of the secondary cell 40 is not limited thereto. For example, the secondary cell 40 may have an angular or hexahedral shape.

An upper portion 40S1 and a lower portion 40S2 of the secondary cell 40 may be fixed in or to the upper frame 100 and the lower frame 200, respectively. The secondary cell 40 may be fixed by using only the upper frame 100 and the lower frame 200. Thus, heat that is generated when the secondary cell 40 is charged and discharged may be radiated or dissipated via a relatively large side surface of the secondary cell 40.

The upper frame 100 and the lower frame 200 of the battery pack frame may be members that accept or accommodate and fix a position of the secondary cell 40. For example, the upper frame 100 may fix a position of the upper portion 40S1 of the secondary cell 40; and the lower frame 200 may fix a position of the lower portion 40S2 of the secondary cell 40, so that the secondary cell 40 may be disposed between the upper frame 100 and the lower frame 200. For example, the upper frame 100 and the lower frame 200 may include fixing portions 110A and 210A, so that the secondary cell 40 may be inserted into the fixing portions 110A and 210A. As described above, in a cylindrical cell, a cross-section of the secondary cell 40 may be circular. Thus, cross-sections of the fixing portions 110A and 210A may be circular so as to correspond to the cross-section of the secondary cell 40. A number of fixing portions 110A and 210A may correspond to a number of the secondary cells 40 to be accommodated in the battery pack frame.

In an implementation, the fixing portions 110A and 210A may be arranged in a zigzag or offset pattern. Arranging the fixing portions 110A and 210A in the zigzag pattern may help ensure that the secondary cells 40 are alternately disposed so as to form a honeycomb. Such a disposition may facilitate an efficient use of a space, thereby ensuring a sufficient space for circulation of air for cooling while accommodating as many secondary cells 40 as possible in the battery pack. The fixing portions 110A and 210A may be arranged in the upper frame 100 and the lower frame 200, respectively, and hereinafter, the fixing portions 110A arranged in the upper frame 100 will be described. The description regarding the fixing portions 110A may be substituted for the description regarding the fixing portions 210A that are arranged in the lower frame 200.

The fixing portion 110A may include an insert hole 111 and a ventilating hole 113.

The upper portion 40S1 of the secondary cell 40 may be inserted into the insert hole 111. For example, the insert hole 111 may be formed by making a groove in the upper frame 100. A diameter w2 of the insert hole 111 may be about equal to a diameter of the secondary cell 40; and a diameter w1 of the ventilating hole 113 above the insert hole 111 may be less than the diameter w2 of the insert hole 111, so that a prominence 112 may be formed. Thus, the upper portion 40S1 of the secondary cell 40 may be inserted into the insert hole 111 until the upper portion 40S1 contacts the prominence 112. Accordingly, the prominence 112 may facilitate stably fixing the secondary cell 40 to the upper frame 100, while simultaneously preventing the secondary cell 40 from penetrating and deviating from the upper frame 100.

The ventilating hole 113 may establish a fluidic connection between external air and the upper end surface 40A1 of the secondary cell 40. Heat that is generated when the secondary cell 40 is charged and discharged may be radiated or dissipated via the ventilating hole 113.

The fixing portion 210A of the lower frame 200 may face the fixing portion 110A of the upper frame 100 and may have the same structure as that of the fixing portion 110A. For example, the fixing portion 210A of the lower frame 200 may also include an insert hole and a ventilating hole, so that the lower end surface 40A2 of the secondary cell 40, which may be inserted into the lower frame 200, may be in fluidic connection with the external air. The secondary cell 40 may have an exposed side surface; and the upper end surface 40A1 and the lower end surface 40A2 may be partially exposed via the ventilating holes 113 of the battery pack frame, so that heat generated in the secondary cell 40 may be radiated or dissipated in both vertical and horizontal directions. Thus, time and speed for heat radiation or dissipation may be significantly increased.

The elastic member 300 may be between the upper frame 100 and the lower frame 200. The elastic member 300 may be in parallel with the first direction, so that the elastic member 300 may connect the upper frame 100 and the lower frame 200. For example, the elastic member 300 may be in a space between the secondary cells 40 that are in parallel with each other, so that space in the battery pack may be efficiently used.

Ends of the elastic member 300 may be fixed to the upper frame 100 and the lower frame 200. For example, the upper frame 100 and the lower frame 200 may include elastic fixing portions 120. In the present embodiment, the elastic fixing portions 120 may be arranged in grooved areas of the upper frame 100 and the lower frame 200, but the arrangement of the elastic fixing portions 120 is not limited thereto. For example, although not illustrated in the drawings, the elastic fixing portions 120 may protrude from the upper frame 100 and the lower frame 200.

The elastic member 300 may facilitate accommodation of the secondary cell between the upper frame 100 and the lower frame 200. Thus, the accommodated secondary cell 40 may be stably maintained. This will be described in detail below.

In order for the secondary cell 40 to be accepted or accommodated in the upper frame 100 and the lower frame 200, a distance between the upper frame 100 and the lower frame 200 may be expanded. Then, the secondary cell 40 may be inserted into the fixing portions 110A and 210A of the upper frame 100 and lower frame 200, respectively. For example, a length of the elastic member 300 may be extendable. Thus, the distance between the upper frame 100 and the lower frame 200 may be easily expanded. Thus, the secondary cell 40 may be easily inserted into the fixing portions 110A and 210A of the upper frame 100 and the lower frame 200, respectively.

After the secondary cell 40 is fixed and accommodated, a structure of the battery pack frame may be stably maintained due to a restoring force of the elastic member 300. For example, a length of the elastic member 300 may be less than a height of the battery pack in which the secondary cell 40 is completely accommodated. For example, the elastic member 300 may have a constant restoring force in the structure of the battery pack having the secondary cell 40 accommodated therein. Thus, it is possible to prevent the upper frame 100 or the lower frame 200 from deviating from the structure of the battery pack. The restoring force of the elastic member 300 may serve as a force that makes the upper frame 100 and the lower frame 200 draw together, so that deviation of the upper frame 100 or the lower frame 200 may be prevented. Thus, the secondary cell 40 between the upper frame 100 and the lower frame 200 may be stably accommodated and maintained.

The elastic member 300 may be formed of an insulating material. The insulating material may include a high-strength plastic, e.g., an engineering plastic or a super engineering plastic, which has a high tensile strength and a high heat resistance. In an implementation, the elastic member 300 may be formed of a metal material whose outer surface is covered with an insulating layer, e.g., an oxidation layer.

Figure 3:
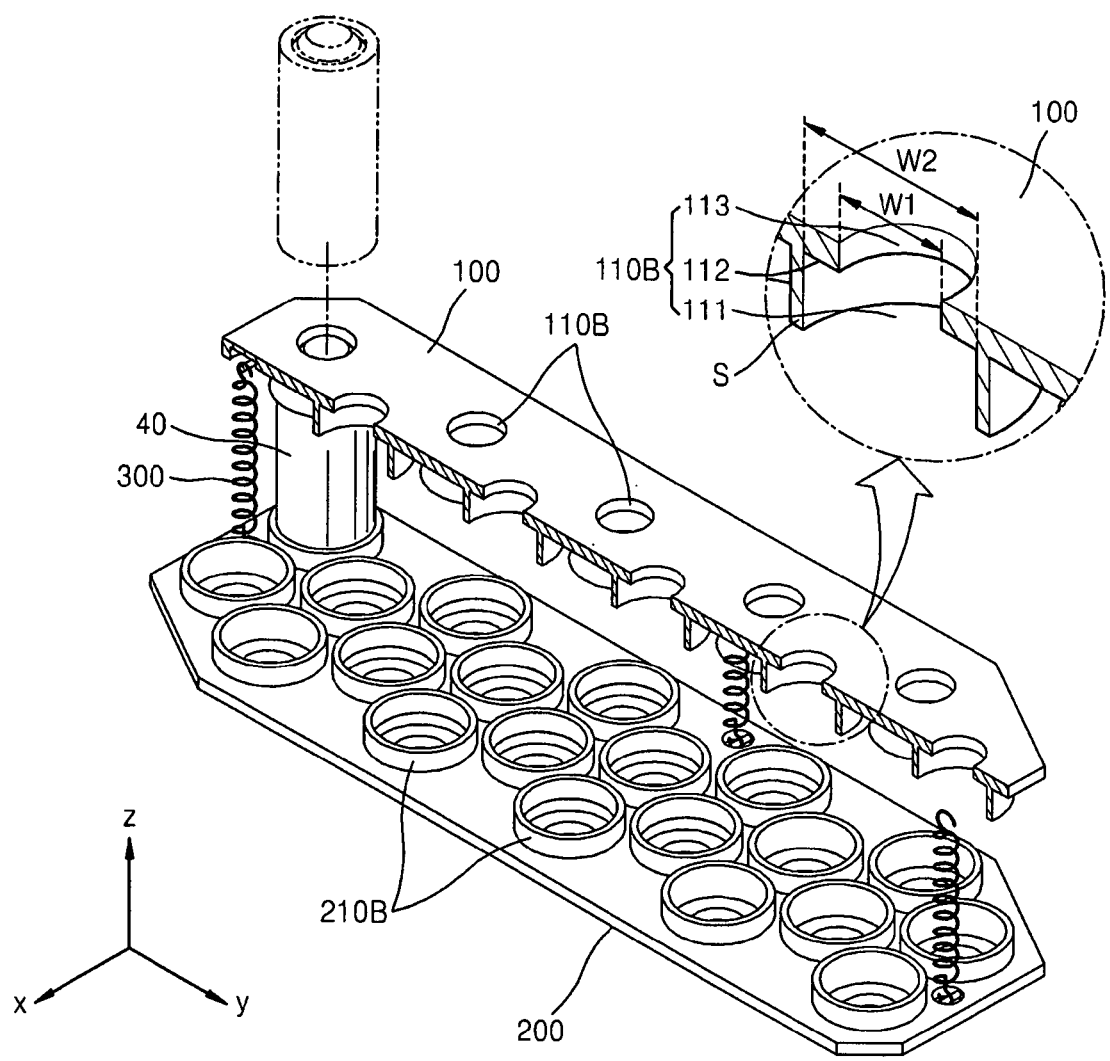
FIG. 3 illustrates a perspective view of a battery pack including a battery pack frame according to another embodiment.
Figure 4:
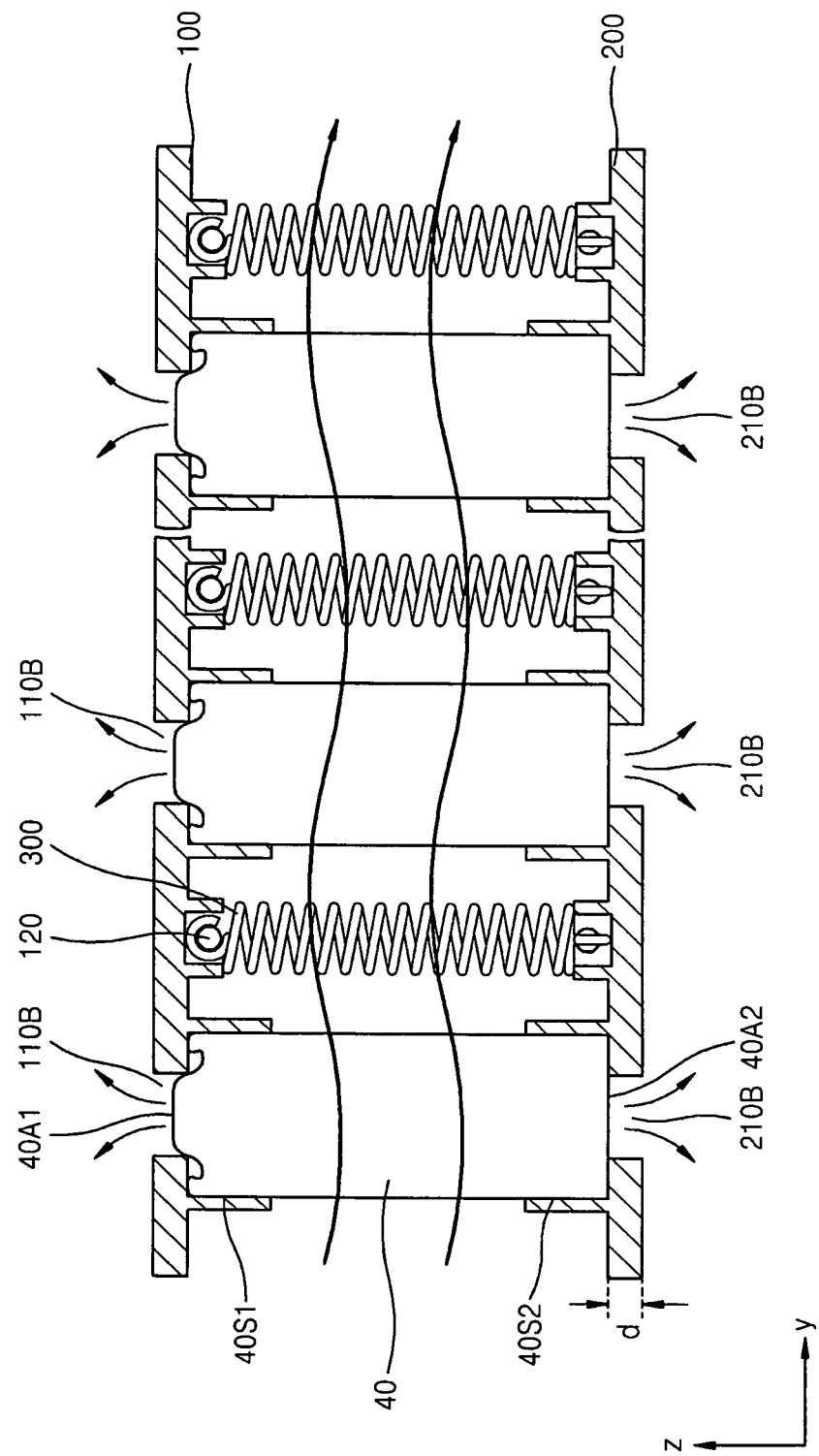
FIG. 4 illustrates a cross-sectional view of the battery pack of FIG. 3.

FIG. 3 illustrates a perspective view of a battery pack including a battery pack frame according to another embodiment. FIG. 4 illustrates a cross-sectional view of the battery pack of FIG. 3. Referring to FIGS. 3 and 4, the battery pack according to the present embodiment may include a plurality of secondary cells 40 and a battery pack frame including an upper frame 100, a lower frame 200, and an elastic member 300. However, the battery pack according to the present embodiment is different from the previous embodiment in that structures of fixing portions 110B and 210B arranged on the upper frame 100 and the lower frame 200 may be projectional. In the present embodiment, a structure of the fixing portions 110B of the upper frame 100 is functionally the same as a structure of the fixing portions 210B of the lower frame 200, and thus, hereinafter, for convenience of description, the fixing portions 110B of the upper frame 100 are mainly described.

The fixing portion 110B may include an insert hole 111 formed by providing a projection wall S on one surface, e.g., a bottom surface, of the upper frame 100. As illustrated in FIG. 3, the projection wall S may be integrally formed with the upper frame 100. For example, the projection wall S may be integrally formed by plastic injection molding. In an implementation, the projection wall S may extend inwardly from the upper frame 100 and lower frame 200.

As described above, the projection wall S may be integrally formed with the upper frame 100, but formation of the projection wall S is not limited thereto. For example, the upper frame 100 may be first manufactured, the projection wall S having a hollow tube shape may be separately manufactured, and then the upper frame 100 and the projection wall S may be connected. A connecting member (not shown) may include, e.g., a separate connecting member such as a bolt or may be an adhesive.

The upper frame 100 may include a ventilating hole 113 above the insert hole 111, the ventilating hole 113 establishing a fluidic connection between external air and an upper end surface 40A1 of the secondary cell 40. A diameter w1 of the ventilating hole 113 may be less than a diameter w2 of the insert hole 111, so that a prominence 112 may be formed. Thus, it is possible to stably fix the secondary cell 40 to the upper frame 100 and to simultaneously to prevent the secondary cell 40 from penetrating and deviating from the upper frame 100.

As described above, the fixing portion 110B may be projectional. Thus, thicknesses d of the upper frame 100 and the lower frame 200 may be small, compared to those of the previous embodiment. For example, the projection wall S capable of supporting an upper portion 40S1 of the secondary cell 40 may be separately formed. Thus, the thickness d of the upper frame 100 may be about equal to a thickness of the ventilating hole 113. Similarly, a projection wall capable of supporting a lower portion 40S2 of the secondary cell 40 may be separately formed. Thus, the thickness d of the lower frame 200 may be about equal to the thickness of the ventilating hole 113.

In the present embodiment, the thicknesses d of the upper frame 100 and the lower frame 200 may be relatively smaller than those of the previous embodiment, so that a height of the assembled battery pack may be decreased. Thus, it is possible to manufacture a compact battery pack.

In the present embodiment, the structure of the fixing portions 110B of the upper frame 100 may be the same as that of the fixing portions 210B of the lower frame 200, but is not limited thereto. For example, the fixing portion 110B of the upper frame 100 may be a projection type as shown in the present embodiment, whereas a fixing portion 210A of the lower frame 200 may be a groove type as shown in the previous embodiment.

Figure 5:
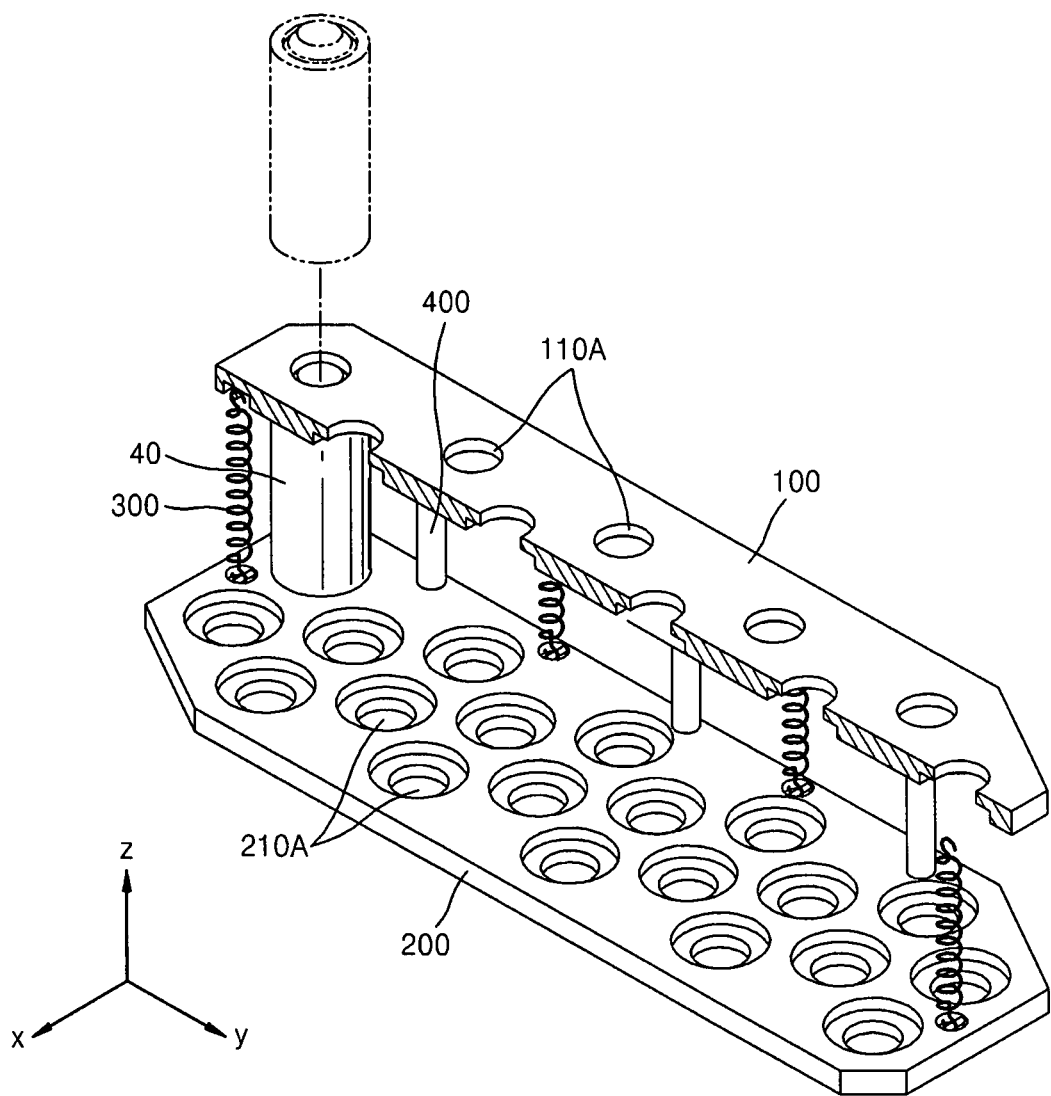
FIG. 5 illustrates a perspective view of a battery pack including a battery pack frame according to yet another embodiment.
Figure 6:
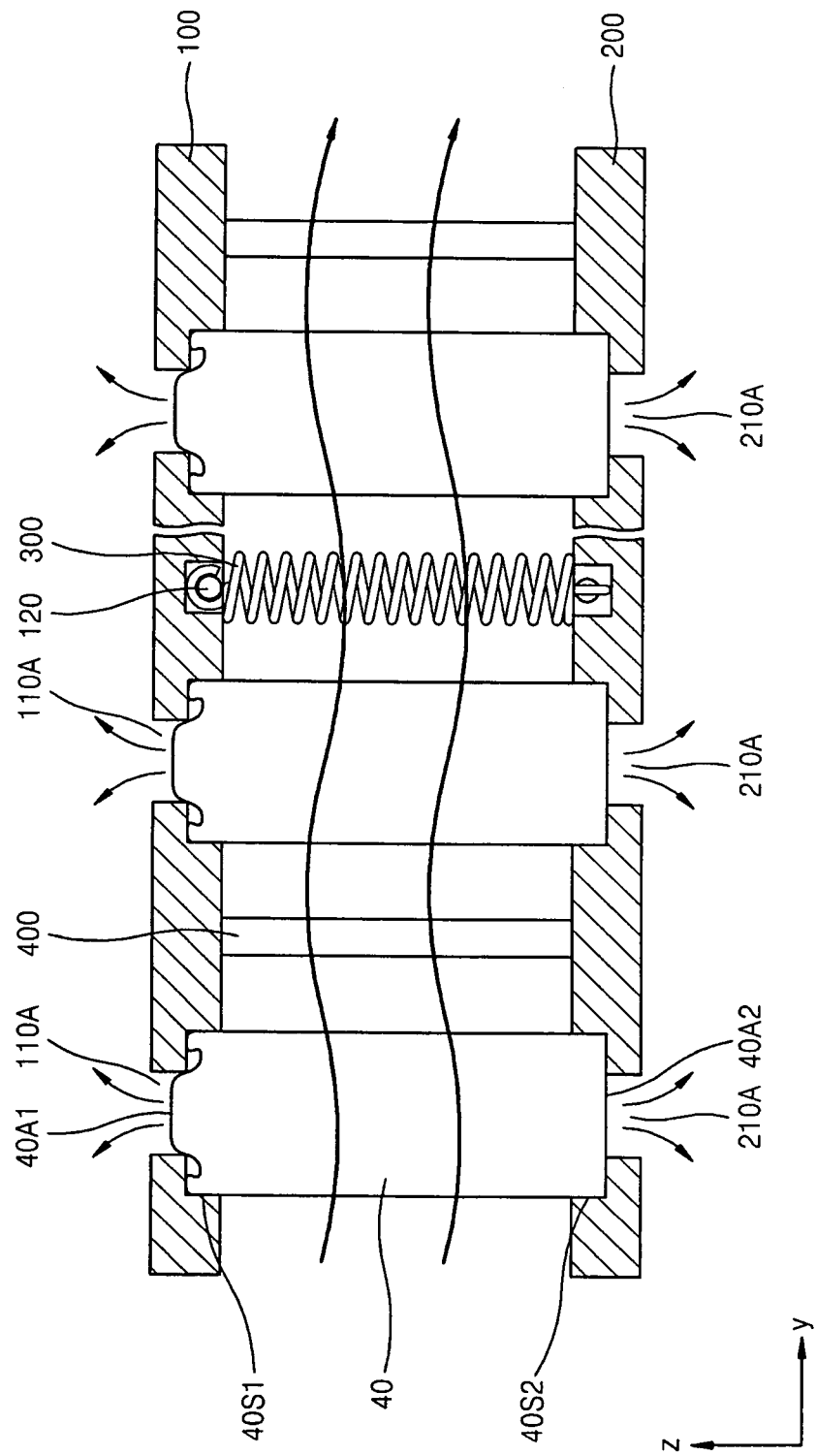
FIG. 6 illustrates a cross-sectional view of the battery pack of FIG. 5.

FIG. 5 illustrates a perspective view of a battery pack including a battery pack frame according to yet another embodiment. FIG. 6 illustrates a cross-sectional view of the battery pack of FIG. 5. Referring to FIGS. 5 and 6, the battery pack according to the present embodiment may include a plurality of secondary cells 40 and a battery pack frame including an upper frame 100, a lower frame 200, and an elastic member 300. However, the battery pack according to the present embodiment is different from the previous embodiments in that the battery pack frame may include a spacer 400 between the upper frame 100 and the lower frame 200. Hereinafter, a detailed structure of the present embodiment will be described in detail with respect to the difference.

The spacer 400 may maintain a distance between the upper frame 100 and the lower frame 200 and may be parallel with the first direction (z-axis direction), e.g., parallel with the secondary cells 40 in the battery pack. Including the spacer 400 in addition to the elastic member 300 may help ensure that the distance between the upper frame 100 and the lower frame 200 is stably maintained.

A shape of the spacer 400 may vary and may include, e.g., a cylindrical shape, a polygonal pillar shape, etc. The spacer 400 may be in a space between the elastic members 300. For example, the spacer 400 and the elastic member 300 may be alternately disposed.

In order to ensure an adequate air flow passage, a diameter of the spacer 400 may be small. In an implementation, the spacer 400 may be formed of an electrically insulating material, e.g., plastic. In another implementation, the spacer 400 may be formed of a metal material and then may be coated with an electrically insulating material.

One end of the spacer 400 may be fixed to the upper frame 100 or the lower frame 200 and another end of the spacer 400 may not be fixed to the battery pack frame. Fixing only one end of the spacer 400 may facilitate accommodating the secondary cell 40 in the battery pack frame. This will be described in detail as below. For convenience of description, in the present embodiment, the end of the spacer 400 is fixed in the upper frame 100.

As described in the previous embodiment, the secondary cell 40 may be accommodated in a manner wherein a length of the elastic member 300 may be extended so as to expand the distance between the upper frame 100 and the lower frame 200. Then, the secondary cell 40 may be inserted into the fixing portion 110A. As the length of the elastic member 300 is extended, the upper frame 100 and the spacer 400 fixed to the upper frame 100 may move in an upward direction, e.g., a z-axis direction of FIG. 5. Moving the spacer 400 in the upward or z-axis direction together with the upper frame 100 means that the upper frame 100 and the lower frame 200 may be connected via only the elastic member 300. Thus, the distance between the upper frame 100 and the lower frame 200 may be easily expanded. If both ends of the spacer 400 were fixed to the upper frame 100 and the lower frame 200, respectively, if a defect were to occur in the secondary cell 40 after being accommodated, it may be difficult to replace the secondary cell 40 with a new one.

Figure 7:
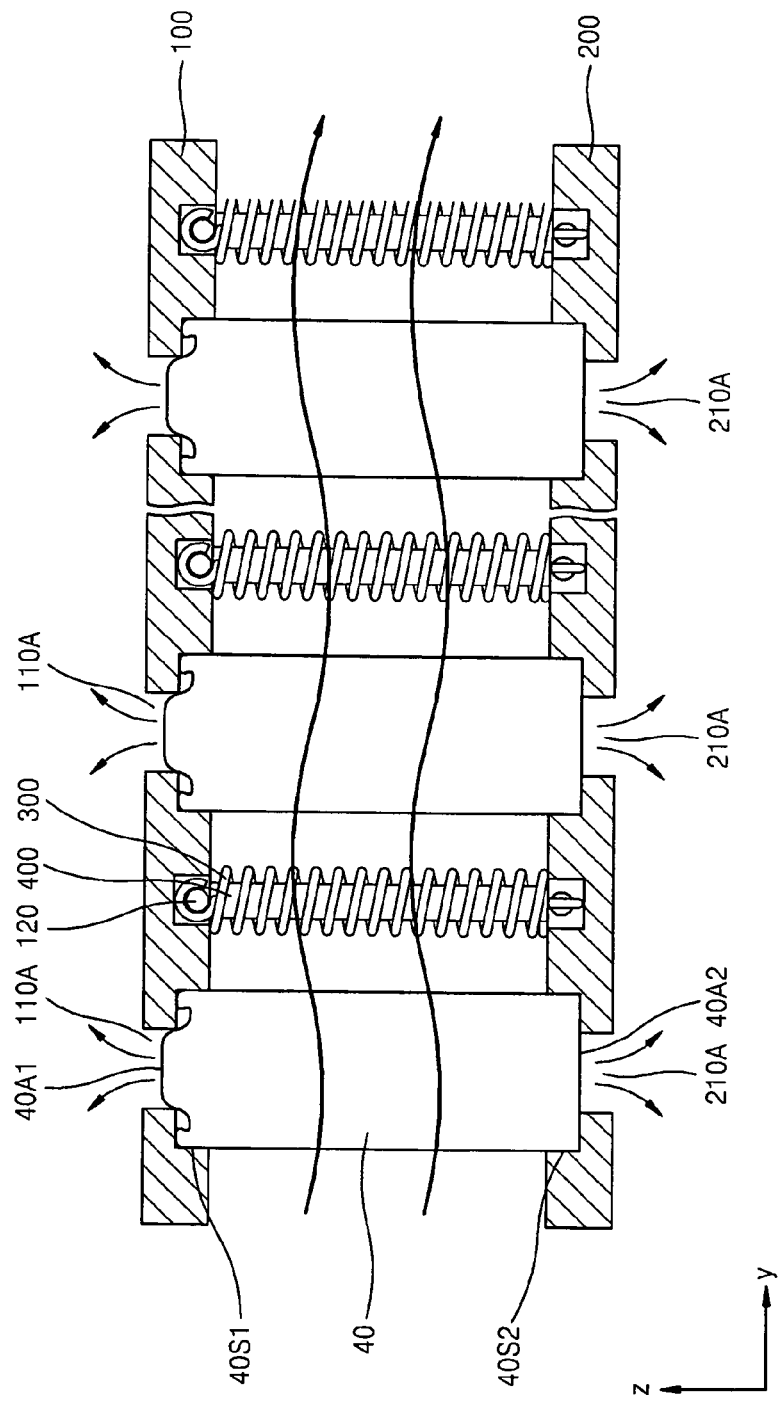
FIG. 7 illustrates a cross-sectional view of a modified example of the battery pack of FIG. 6.

FIG. 7 illustrates a cross-sectional view of a modified example of the battery pack of FIG. 6. Referring to FIG. 7, the spacer 400 may be in the elastic member 300, e.g., may be surrounded by or within the elastic member 300. For example, the elastic member 300 may be a coil type pressed spring having an empty inner space; and the spacer 400 may be in the empty inner space. Thus, it may not be necessary to provide a separate space for the spacer 400. Accordingly, space in the battery pack frame may be efficiently used, e.g., a space for the flow of air may not be reduced, thereby providing a compact battery pack.

Figure 8:
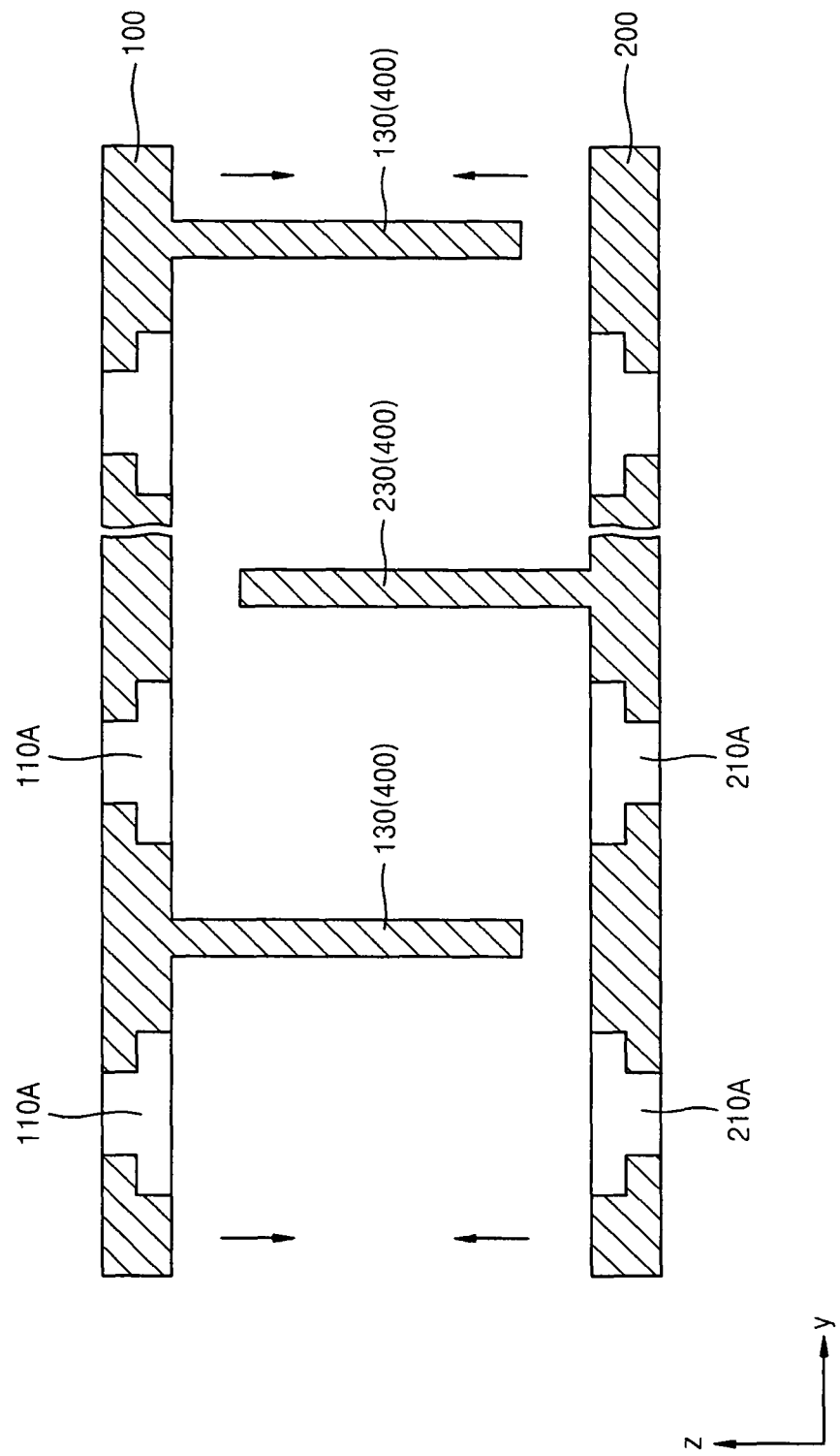
FIG. 8 illustrates a cross-sectional view of modified examples of an upper frame and a lower frame of the battery pack frame of FIG. 7.

FIG. 8 illustrates a cross-sectional view of modified examples of an upper frame and a lower frame of the battery pack frame of FIG. 6 or FIG. 7. In the present modified example, the spacer 400 of the battery pack frames of FIGS. 6 and 7 may be integrally formed with the upper frame 100 or with the lower frame 200. For example, the spacer 400 may be integrally formed by plastic injection molding.

The plurality of spacers 400 may be regularly arranged, and in an implementation, some spacers 130 (400) may be integrally formed with the upper frame 100, and other spacers 230 (400) may be integrally formed with the lower frame 200. As illustrated in FIG. 8, neighboring spacers 400 may be integrally formed with the upper frame 100 and the lower frame 200 according to an alternate order. This symmetrical configuration may help ensure that the battery pack is stably maintained.

Figure 9:
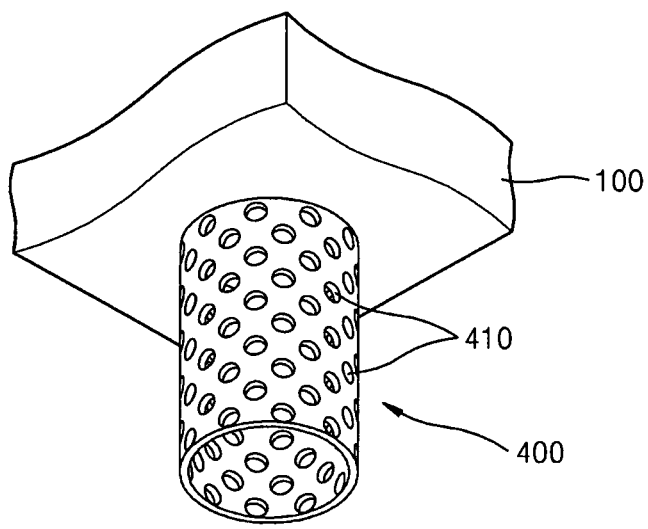
FIG. 9 illustrates a perspective view of a modified example of a spacer of the battery pack frame of FIG. 6.
Figure 10:
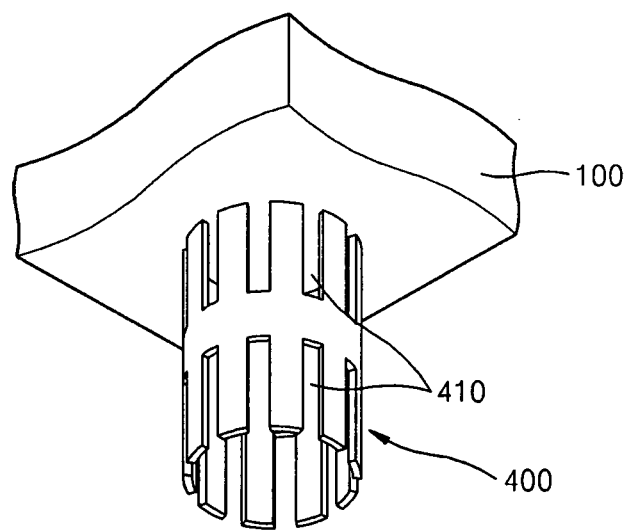
FIG. 10 illustrates a perspective view of another modified example of the spacer of the battery pack frame of FIG. 6.

FIG. 9 illustrates a perspective view of a modified example of a spacer of the battery pack of FIG. 6. FIG. 10 illustrates a perspective view of another modified example of the spacer of the battery pack of FIG. 6. For convenience of description, an end of the spacer 400 is illustrated as being connected to an upper frame 100. The spacer 400 may include one or more air ventilation holes 410. For example, as illustrated in FIG. 9, the spacer 400 may include a plurality of air ventilation holes 410 that are, e.g., rounded or oval-shaped. Also, as illustrated in FIG. 10, the spacer 400 may include a plurality of air ventilation holes 410 that are, e.g., slit-shaped.

The spacer 400 having the air ventilation holes 410 thereon may be applied to any of the embodiments described with reference to FIGS. 5 through 7.

Also, as illustrated in FIGS. 9 and 10, the spacer 400 may have a cylindrically hollow tube shape, but a shape of the spacer 400 is not limited thereto. For example, the spacer 400 may have a polygonal pillar shape.

As described above, according to the embodiments, only the upper portion and lower portion of the secondary cell may be fixed to or held in place by the upper frame and the lower frame, so that heat generated during charging and discharging operations of the secondary cell may be dissipated or cooled via a side surface of the secondary cell which is relatively large.

Also, the upper frame and the lower frame may be connected by using the elastic member; and the spacer may be arranged so that the secondary cell may be easily accommodated. Thus, an assembled structure of the upper frame and the lower frame may be stably maintained.

The embodiments may help ensure that the secondary cells of the battery pack stably maintain their original assembled positions so as not to deviate from those positions, even if the battery pack experiences shocks and vibrations when moving. The battery pack may be manufactured by combining the secondary cells, and the secondary cells may be electrically connected to each other when the secondary cells are not completely assembled. Accordingly, the embodiments may help prevent movement or deviation of the secondary cells during the electrical connecting operation, thereby ensuring convenience in performing the electrical connecting operation.

The embodiments provide a battery pack frame in which one or more secondary cells are efficiently cooled.

The embodiments provide a battery pack frame in which one or more secondary cells are easily assembled, and an assembled state of the one or more secondary cells is stably maintained.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack frame for accommodating a plurality of secondary cells arranged in parallel with each other, each secondary cell extending axially in a first direction, the battery pack frame comprising:

an upper frame for coupling with an upper portion of each of the plurality of secondary cells so as to accommodate the plurality of secondary cells;

a lower frame facing the upper frame, the lower frame being for coupling with a lower portion of each of the plurality of secondary cells, the upper and lower frames being spaced from each other in the first direction, wherein the upper frame has an inner side, the lower frame has an inner side, and the inner side of the upper frame faces the inner side of the lower frame; and a plurality of elastic members disposed in parallel with each other, extending between the inner side of the upper frame and the inner side of the lower frame in the first direction, and being in a space between areas for accommodating adjacent ones of the plurality of secondary cells, wherein the upper frame and the lower frame include fixing portions in which the plurality of secondary cells are insertable.

2. The battery pack frame as claimed in claim 1, wherein the fixing portions of the upper frame face the fixing portions of the lower frame.

3. The battery pack frame as claimed in claim 1, wherein the fixing portions of the upper frame and the fixing portions of the lower frame respectively include insert holes therein, the insert holes having a groove shape.

4. The battery pack frame as claimed in claim 1, wherein the fixing portions of the upper frame and the fixing portions of the lower frame respectively include insert holes thereon, the insert holes having a projectional shape.

5. The battery pack frame as claimed in claim 4, wherein the insert holes having the projectional shape include a projection wall extending inwardly in the first direction from the upper and lower frames.

6. The battery pack frame as claimed in claim 1, wherein the fixing portions include ventilating holes for establishing a fluidic connection between external air and upper end surfaces of the plurality of secondary cells.

7. The battery pack frame as claimed in claim 1, wherein:
one end of each elastic member is fixed to the upper frame, and
another end of each elastic member is fixed to the lower frame.

8. The battery pack frame as claimed in claim 1, wherein the plurality of elastic members are alternately arranged with respect to spaces for accommodating the plurality of secondary cells.

9. The battery pack frame as claimed in claim 1, wherein the elastic members include an insulating material.

10. The battery pack frame as claimed in claim 1, further comprising a plurality of spacers between the upper frame and the lower frame, the spacers being parallel with the first direction.

11. The battery pack frame as claimed in claim 10, wherein:
one end of each of the plurality of spacers is fixed to the upper frame or the lower frame, and
another end of each of the plurality of spacers is not fixed to the battery pack frame.

12. The battery pack frame as claimed in claim 10, wherein the plurality of elastic members and the plurality of spacers are alternately disposed to provide spaces therebetween for accommodating the plurality of secondary cells.

13. The battery pack frame as claimed in claim 10, wherein each spacer is surrounded by one of the elastic members.

14. The battery pack frame as claimed in claim 10, wherein each of the spacers includes one or more air ventilation holes.

15. The battery pack frame as claimed in claim 14, wherein the air ventilation holes have a rounded shape.

16. The battery pack frame as claimed in claim 14, wherein the air ventilation holes have a slit shape.

17. The battery pack frame as claimed in claim 10, wherein:
ends of some of the spacers are fixed to the upper frame,
ends of other spacers are fixed to the lower frame, and
the spacers having ends fixed to the upper frame are alternately disposed relative to the other spacers having ends fixed to the lower frame.

18. The battery pack frame as claimed in claim 1, wherein at least one side of the inner side of the upper frame and the inner side of the lower frame includes an elastic fixing portion thereon, the elastic fixing portion fixing ends of each elastic member of the plurality of elastic members to the at least one inner side of the upper frame or the lower frame.

19. The battery pack frame as claimed in claim 1, wherein each elastic member of the plurality of elastic members has a coiled spring structure.

* * * * *